US011451046B2

(12) United States Patent
Logan et al.

(10) Patent No.: US 11,451,046 B2
(45) Date of Patent: Sep. 20, 2022

(54) SINGLE SWITCH ELECTRONIC FUSES WITH MULTIPLE POWER OUTPUTS

(71) Applicant: Hewlett-Packard Development Company, L.P., Spring, TX (US)

(72) Inventors: Nathan Logan, Boise, ID (US); Robert G Mejia, Boise, ID (US); Manuel Antonio Rodriguez, Boise, ID (US); James Jensen, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 103 days.

(21) Appl. No.: 16/975,234

(22) PCT Filed: Mar. 22, 2018

(86) PCT No.: PCT/US2018/023776
§ 371 (c)(1),
(2) Date: Aug. 24, 2020

(87) PCT Pub. No.: WO2019/182598
PCT Pub. Date: Sep. 26, 2019

(65) Prior Publication Data
US 2020/0403398 A1   Dec. 24, 2020

(51) Int. Cl.
*H02H 3/10* (2006.01)
*H02H 7/26* (2006.01)

(52) U.S. Cl.
CPC .............. *H02H 3/105* (2013.01); *H02H 7/26* (2013.01)

(58) Field of Classification Search
CPC ............ H02H 3/08; H02H 3/105; H02H 3/42; H02H 7/26; H02J 4/00; H02J 1/102; H02J 3/005; H02J 3/0073; H02J 3/46; H02J 3/14; H02M 3/33523

See application file for complete search history.

(56) References Cited

U.S. PATENT DOCUMENTS

| 7,012,827 B2 | 3/2006 | Chung |
| 7,515,399 B2 | 4/2009 | Kriegesmann et al. |
| 7,675,739 B2 | 3/2010 | Ewing et al. |
| 8,050,005 B2 | 11/2011 | Lindqvist et al. |
| 8,976,499 B2 | 3/2015 | Pracht et al. |

(Continued)

FOREIGN PATENT DOCUMENTS

| DE | 102008049101 A1 | 5/2009 |
| EP | 2741387 A1 | 6/2014 |

(Continued)

*Primary Examiner* — Jared Fureman
*Assistant Examiner* — Nicolas Bellido
(74) *Attorney, Agent, or Firm* — Mannava & Kang

(57) ABSTRACT

In example implementations, an apparatus is provided. The apparatus includes a plurality of power outputs, a logic controller and a single switch. Each one of the plurality of power outputs is communicatively coupled to a respective current/power sensor. The logic controller is communicatively coupled to the respective current/power sensor of each one of the plurality of power outputs. The single switch is communicatively coupled to the logic controller and the respective current/power sensor of each one of the plurality of power outputs. Power to each one of the plurality of power outputs is controlled by the logic controller via the single switch.

14 Claims, 4 Drawing Sheets

(56) References Cited

U.S. PATENT DOCUMENTS

| | | |
|---|---|---|
| 2009/0153110 A1 | 6/2009 | Huang |
| 2009/0312883 A1* | 12/2009 | Myllymaki ............ H02J 9/005 |
| | | 700/297 |
| 2013/0140892 A1 | 6/2013 | Simper |
| 2014/0078629 A1* | 3/2014 | Cortigiani ............. H03K 17/24 |
| | | 361/79 |
| 2017/0012431 A1 | 1/2017 | Benton et al. |
| 2017/0253207 A1 | 9/2017 | Seid |
| 2018/0287365 A1* | 10/2018 | Djelassi-Tscheck ... H02H 3/085 |
| 2021/0050718 A1* | 2/2021 | Djelassi-Tscheck ... H02H 5/044 |
| 2021/0183592 A1* | 6/2021 | Nahles .................... H02H 3/08 |
| 2021/0257826 A1* | 8/2021 | Trumbo ............... H02H 1/0007 |

FOREIGN PATENT DOCUMENTS

| | | |
|---|---|---|
| EP | 2869445 A1 | 5/2015 |
| EP | 2013954 A4 | 2/2018 |

\* cited by examiner

SINGLE SWITCH ELECTRONIC FUSES WITH MULTIPLE POWER OUTPUTS

BACKGROUND

Electronic devices operate with power from a power source. Some electronic devices draw power from batteries, while other electronic devices draw power from an external power source such as a 120 Volt Alternating Current (AC) wall outlet.

Some electronic devices can be sensitive to spikes in current. Sudden spikes in current can cause permanent damage to the various electronic components within the electronic device. To prevent damage from sudden spikes in current, some electronic devices may use a fuse. The fuse may help to prevent damage to the electronic device, or prevent fires when too much current is sent to the electronic device due to variations in the power source.

DETAILED DESCRIPTION

Examples described herein provide a design for single switch electronic fuses with multiple power outputs and a method for controlling the same. As discussed above, the fuses can be used to prevent damage to electronic devices or fires from sudden spikes, or excessive constant current, in current from a power source. Previous fuses were designed to detect current. In addition, previous designed fuses may not activate quickly enough when spikes in current were detected.

The single switch electronic fuse of the present disclosure uses a single switch to control power to a plurality of power outputs. The plurality of power outputs may each have a respective current/power sensor that monitors power or current. Thus, the single switch electronic fuse of the present disclosure can activate or toggle a single switch to control power to a plurality of different power outputs based on monitoring an amount of power instead of current. In addition, the single switch electronic fuse of the present disclosure can activate quickly to meet certain safety regulations and/or standards.

In addition, as noted above, the present disclosure allows a plurality of power outputs to be controlled by a single switch. The electronic switch device in an electronic fuse may be the most expensive component within a fuse. Typically, each fuse would use a separate electronic switch device. Thus, there may be a high cost when implementing multiple fuses for multiple power outputs in a device using separate electronic switch devices for each fuse.

The present disclosure uses a single electronic switch device in operation with a logic circuit or controller for a plurality of power outputs. As a result, the cost to control power to multiple power outputs may be significantly reduced using the single switch electronic fuse of the present disclosure.

Figure 1:
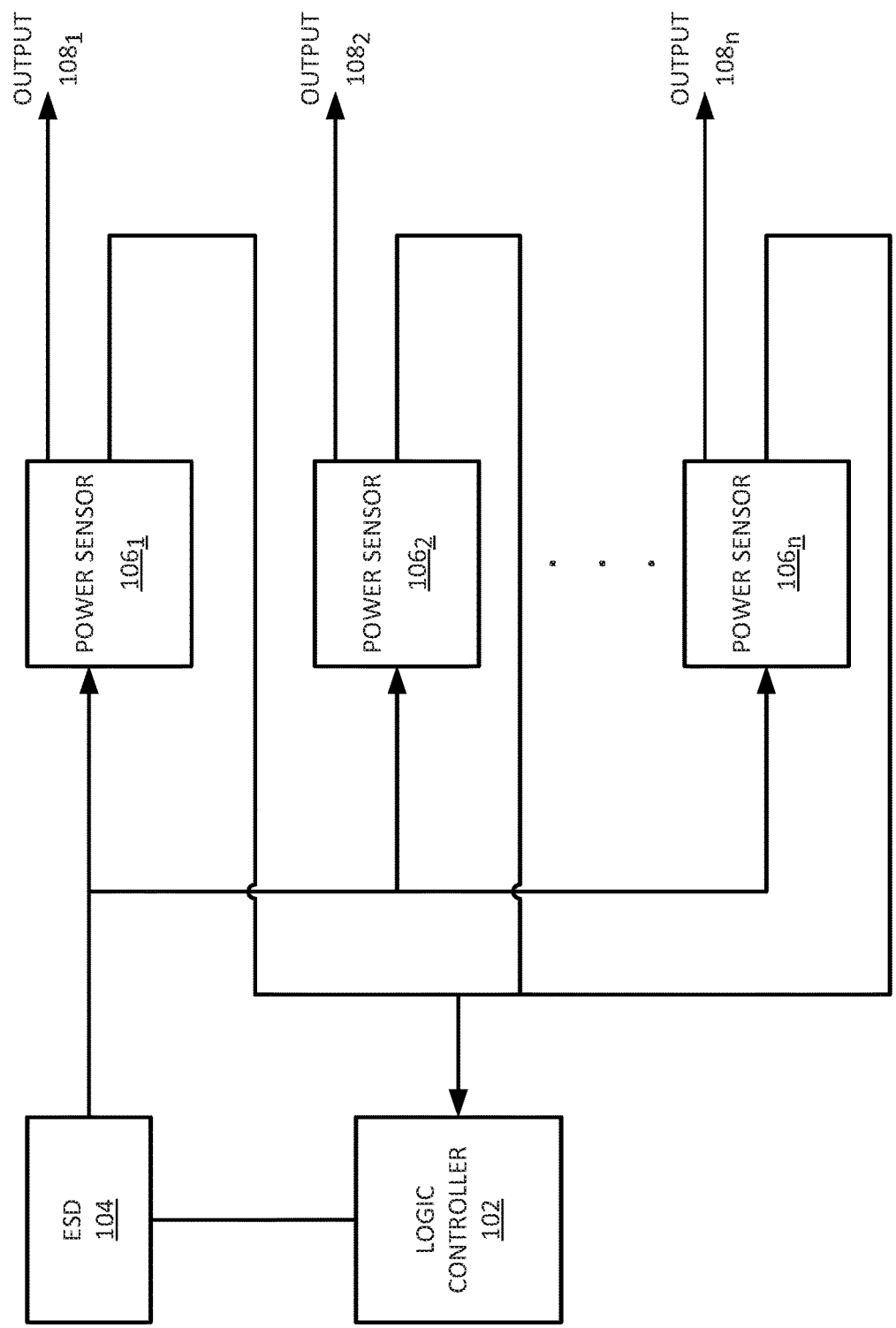
FIG. 1 is a block diagram of an example of a single switch electronic fuse with multiple power outputs of the present disclosure.

FIG. 1 illustrates a block diagram of an example single switch electronic fuse 100 (also referred to herein as a fuse 100) of the present disclosure. The fuse 100 may be designed or deployed as a discrete circuit or an integrated circuit. The fuse 100 may be deployed as a subsystem in an electronic device or system or may be part of a power supply.

In one example, the fuse 100 may include a logic controller 102, an electronic switch device (ESD) 104, and a plurality of current/power sensors $106_1$-$106_n$ (hereinafter also referred to individually as a current/power sensor 106 or collectively as current/power sensors 106). The fuse 100 may include a plurality of power outputs $108_1$ to $108_n$ (hereinafter also referred to individually as a power output 108 or collectively as power outputs 108) that are communicatively coupled to a respective power sensor $106_1$-$106_n$.

In one example, the logic controller 102 may be communicatively coupled to each one of the current/power sensors 106 and the ESD 104. The ESD 104 may be coupled to each one of the power sensors 106.

The logic controller 102 may be implemented as a processor or specialized circuit that controls operation of the ESD 104 in response to power levels monitored by each current/power sensor 106. The fuse 100 may limit an amount of power to each output 108 of each power sensor 106. For example, power may be provided through the ESD 104 as 500 watts (W) (e.g., a 24 volt (V) at 20.83 amperes (Amps)). If five current/power sensors 106 are deployed, then the fuse 100 may be designed to limit each power output 108 to 100 W of power. In some examples, the amount of power may be distributed unevenly among the current/power sensors 106. For example, if three current/power sensors 106 are deployed for 500 W, then two of the current/power sensors 106 may have a limit of 100 W and a third current/power sensor 106 may have a limit of 300 W.

The amount of power limited to each current/power sensor may be based on a standard. For example, certain standards may require additional fire protection around the current/power sensors 106 and the outputs 108 if the fuse 100 does not limit the power output to 100 W. In other words, the fuse 100 may be designed to split the input power into individual power outputs 108 of a desired wattage.

Some designs provide a separate switch for each fuse. Thus, if the power output threshold is breached, the respective switch may be tripped to trip the fuse. However, the switch may be a relative expensive part.

The present disclosure provides a design that deploys a single switch, the ESD 104 that controls power to each one of the current/power sensors 106 and respective power outputs 108. In one example, when the power threshold is breached (e.g., 100 W for certain standards), the logic controller 102 may toggle the ESD 104, thereby cutting off power to the power outputs 108. Thus, by using an ESD 104, a significant portion of the costs to build the fuse 100 can be reduced.

In addition, the fuse 100 of the present disclosure monitors power versus current as done in some fuse designs. The current/power sensors 106 are designed to monitor power to compensate for variations in the input voltage.

Figure 2:
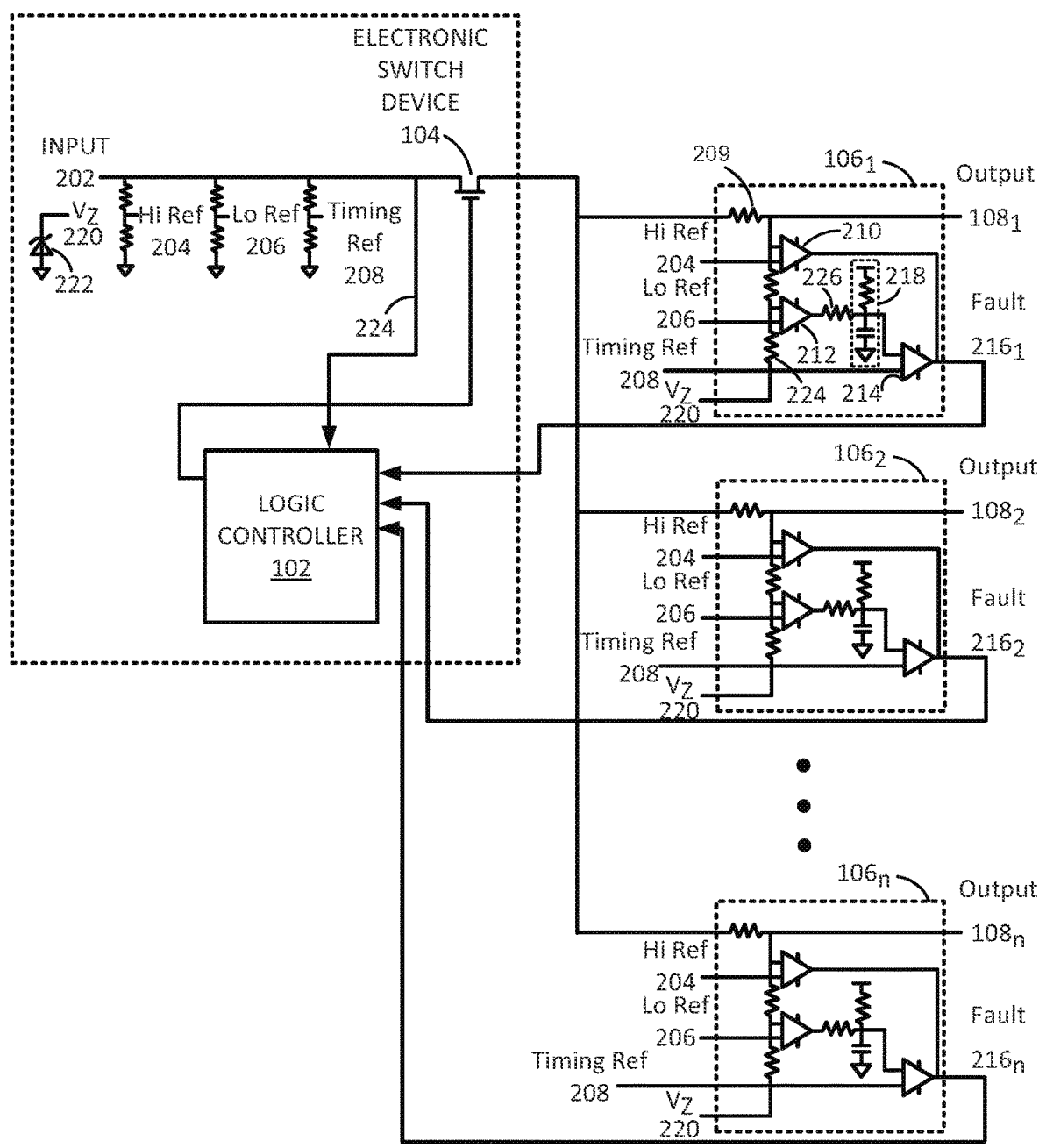
FIG. 2 is a more detailed block diagram of an example of the single switch electronic fuse with multiple power outputs of the present disclosure.

FIG. 2 illustrates a more detailed block diagram of the example fuse 100 of the present disclosure. FIG. 2 illustrates the logic controller 102, the ESD 104, current/power sensors 106 and the power outputs 108, similar to FIG. 1. In one example, an input 202 may be provided through the ESD 104. As noted above, the input 202 may be a 24 V source.

A bias input 224 may be coupled to the logic controller 102 to power the logic controller 102 off of the input 202.

In one example, the fuse 100 may also include a high reference voltage 204 (e.g., hi ref), a low reference voltage 206 (e.g., lo ref), and a timing reference 208 (e.g., timing ref). The hi ref 204, the lo ref 206 and the timing ref 208 may be fed to the current/power sensors 106, as discussed in further details below. Notably, the fuse 100 includes a single set of reference voltages (e.g., the hi ref 204, the lo ref 206, and the timing ref 208) rather than having separate sets of reference voltages for each current/power sensor 106.

In one example, each one of the current/power sensors $106_1$ to $106_n$ may also have a fault line $216_1$ to $216_n$ (hereinafter also referred to individually as a fault line 216 or collectively as fault lines 216). When a fault signal is generated, the fault signal may be transmitted to the logic controller 102 via the respective fault line 216. In response, the logic controller 102 may toggle the ESD 104 to stop delivering power to the power outputs 108. At a later time, when the fault signal is no longer transmitted or asserted, the logic controller 102 may toggle the ESD 104 again to resume delivering power to the power outputs 108.

FIG. 2 illustrates the current/power sensors 106 in further detail. The details of the current/power sensor $106_1$ are illustrated and discussed below, but it should be noted that current/power sensors $106_2$ to $106_n$ may include the same components and operate in a similar manner. In one example, the current/power sensors 106 may include a comparator 210, 212, and 214. In one example, the comparators 210, 212, and 214 may be open drain type. This may allow connecting the comparator outputs (e.g., the fault line 216) together to get a logical OR type connection of the power outputs 108.

The comparators 210 and 212 may be used to compare the voltage off of a sense resistor 209. The sense resistor 209 may have a fairly small resistance (e.g., approximately 0.050 Ohms (Ω)), in an example, where the input voltage is 24 V, the sense resistor 209 may produce a voltage that is about 200 millivolts (mV) below the 24 V input 202 when there is approximately 4 Amps of current flowing to the power output 108.

As noted above, the lo ref 206 may be fed to the current/power sensors 106. The lo ref 206 may be coupled to the comparator 212. The lo ref 206 may be a direct current (DC) voltage that is generated before arriving to the current/power sensor 106 (e.g., via an alternating current (AC) to DC converter, a voltage divider, a reference, and the like, that are not shown). The low ref 206 may also be approximately 200 mV below the 24 V input 202, The comparator 212 may activate its output whenever the voltage from the sense resistor 209 drops below a low threshold (e.g., 200 mV or more below the 24 V input voltage 202). The example above may correspond to just below 100 W of power.

The output of the comparator 212 may be routed through a filter circuit 218. The filter circuit 218 may cause a delay in asserting the fault line 216. The delay may be implemented based on certain regulatory safety standards for output power in devices. For example, certain regulatory safety standards may allow the power output 108 to exceed a power limit threshold for a predefined amount of time (e.g., five seconds). In one example, the filter circuit 218 may implement a delay for approximately two seconds.

In one example, when the comparator 212 activates its output, the output voltage of the filter circuit 218 may slowly rise with a rising exponential that has a time constant of a few seconds. This slow rise is how the delay (e.g., two seconds) may be implemented.

The timing ref 208 may be coupled to the comparator 214. The comparator 214 may compare the timing ref 208 to the filtered signal from the filter circuit 218. The filter circuit 218 may have a fault assertion delay and a fault removal delay. The amount of delay for the two delays may be different. When the output from the filter circuit 218 exceeds the timing ref 208 (e.g., approximately two seconds after the comparator 212 activates its output), the fault signal may be asserted in the fault line 216 and routed back to the logic controller 102. In response, the logic controller 102 may toggle the ESD 104, as discussed above.

In some implementations, the filter circuit 218 may be configured to have different timing parameters. As a result, some of the current/power sensors 106 may respond faster than other current/power sensors 106.

In one example, a resistor 226 may be included before the filter circuit 218. The resistor 226 may provide a delay before the power sensor is 106 is reset. In other words, the resistor 226 may increase the amount of time the power is to be below 100 W before resetting.

In one example, the comparator 212 may also be coupled to a feedback sub-circuit that comprises a Zener diode 222 and a resistor 224 (also referred to herein in combination as a "Zener resistor"). A Zener voltage ($V_z$) 220 may be provided through the Zener diode 222 and the resistor 224 to the comparator 212. The Zener voltage 220 may allow the threshold values to dynamically change based on fluctuations of the voltage provided via the input 202. In other words, the Zener resistor may compensate for the tolerance variations of the voltage at the input 202 by allowing the current at which the current/power sensor 106 trips to adjust dynamically in response to the input voltage.

The hi ref 204 may be coupled to the comparator 210. The hi ref 204 may be similar to the lo ref 206, but may be located farther from the 24 V input 202 than the lo ref 206. For example, the hi ref 204 may be set at a high threshold of 400 mV that is larger than the low threshold for the lo ref 206 of 200 mV described above. Thus, the comparator 210 may activate its output when the current exceeds approximately 8 Amps. The output of the comparator 210 may be unfiltered and may immediately assert the fault signal in the fault line 216. The comparator 210 may be used to protect the fuse 100 from excessive currents that may damage the fuse 100 in the event of a short circuit of the power outputs 108, or any other conditions that may drive the current of the power outputs 108 excessively high.

It should be noted that although FIGS. 1 and 2 illustrate a single ESD 104, some examples may include multiple ESDs 104 that are used to partition different groups of current/power sensors 106. In other words, there may be multiple ESDs 104, but less than a number of the current/power sensors 106. As a result, each partition may power different domains and each domain may be controlled by a single ESD 104. However, a single logic controller 102 may control operation of the ESD 104 for each partition.

Figure 3:
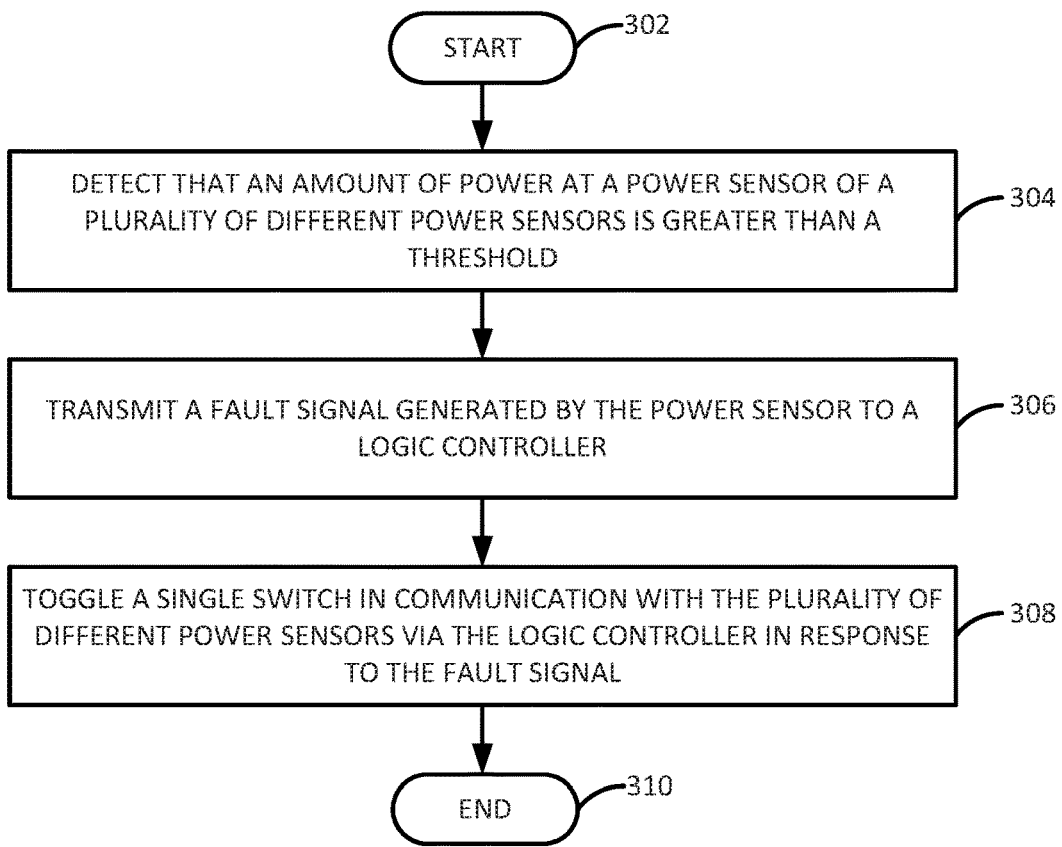
FIG. 3 is a flow chart of an example method for controlling a plurality of power outputs in an electronic fuse with a single switch.

FIG. 3 illustrates a flow diagram of an example method 300 for controlling a plurality of power outputs in an electronic fuse with a single switch. In one example, the method 300 may be performed by the apparatus 100 or the apparatus 400 illustrated in FIG. 4 and described below.

At block 302, the method 300 begins. At block 304, the method 300 detects that an amount of power at a current/power sensor of a plurality of different current/power sensors is greater than a threshold. For example, in one example, the current/power sensor may be designed to detect an excessive amount of current and shut down immediately. The threshold may be a high threshold. The high threshold may be exceeded and a fault signal may be immediately generated or asserted.

In another example, the current/power sensor may also be designed to detect an excessive amount of power and shut down after a predefined amount of time delay. For example, the threshold may be a low threshold. The low threshold may be exceeded and a fault signal may be generated or asserted after a time delay. For example, a timing reference signal and a filter circuit may be used, as described above, to implement the time delay for the low threshold.

In one example, the power threshold for each one of the current/power sensors may be set to a different value. In one example, the power threshold may be dynamically set. For example, each current/power sensor may include a circuit associated with a different power threshold and a switch to select the power threshold of one of the circuits. The power threshold may be switched by the logic controller or an external agent (e.g., a user via a user interface in communication with the logic controller to switch the power threshold).

At block 306, the method 300 transmits a fault signal generated by the current/power sensor to a logic controller. The fault signal may be transmitted over a fault line that is communicatively coupled to the logic controller.

At block 308, the method 300 toggles a single switch in communication with the plurality of different current/power sensors via the logic controller in response to the fault signal. For example, the single switch may be an electronic switch device that is communicatively coupled to each one of the current/power sensors and respective power outputs of the current/power sensors. When the single switch is toggled, or activated, the single switch may prevent power from being delivered to the power outputs.

In one example, the current/power sensor that generated the fault signal may periodically compare the amount of power to the threshold to determine if the threshold is still exceeded. To check the system state, the logic controller may switch on the ESD temporarily to see if the fault still exists. When the current/power sensor determines that the threshold is no longer exceeded, the fault signal can be removed and the fault signal may cease transmission to the logic controller via the fault line. In one example, periodically may include when the input voltage or power to the fuse is cycled off and back on to clear the short or any other type of condition that caused the excessive power. In response, the logic controller may toggle the single switch again to resume providing power to the current/power sensors and power outputs.

In one example, the controller may ignore faults when the system first powers on. For example, when power is restored, spikes in current or power may occur. The controller may be set to ignore faults for a predefined period of time (e.g., 20 milliseconds) after the system is first powered on such that the fault signal is not continuously generated.

In an example, different current/power sensors may have different policies for fault recovery. For example, some outputs of some of the current/power sensors may be tested more frequently than others, some outputs of some of the current/power sensors may have a higher time period for testing fault free before restoring power, and the like.

The method 300 may be continuously repeated as long as an input voltage is provided. At block 310, the method 300 ends.

Figure 4:
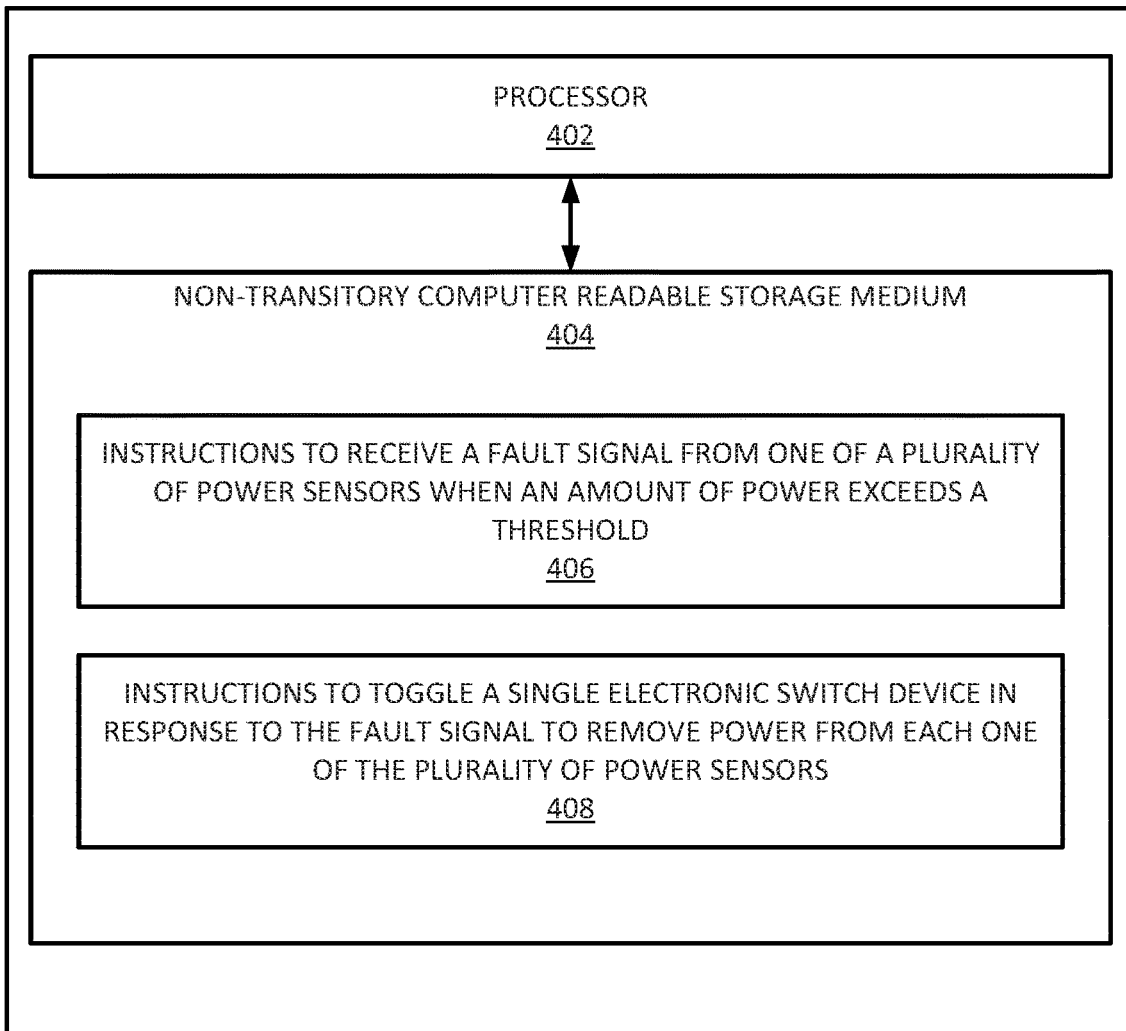
FIG. 4 is a block diagram of an example non-transitory computer readable storage medium storing instructions executed by a processor.

FIG. 4 illustrates an example of an apparatus 400. In one example, the apparatus 400 may be the apparatus 100. In one example, the apparatus 400 may include a processor 402 and a non-transitory computer readable storage medium 404.

The non-transitory computer readable storage medium 404 may include instructions 406 and 408 that, when executed by the processor 402, cause the processor 402 to perform various functions.

In one example, the instructions 406 may include instructions to receive a fault signal from one of a plurality of current/power sensors when an amount of power exceeds a threshold. The instructions 408 may include instructions to toggle a single electronic switch device in response to the fault signal to remove power from each one of the plurality of current/power sensors. In one example, the non-transitory computer readable storage medium may include further instructions to detect when the fault signal is stopped and to toggle the single electronic switch device to resume providing power to the each one of the plurality of current/power sensors.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a plurality of power outputs, wherein each one of the plurality of power outputs is communicatively coupled to a respective current/power sensor;
a logic controller communicatively coupled to a respective fault lite of the respective current/power sensor of each one of the plurality of power outputs; and
a single switch communicatively coupled to the logic controller and the respective current/power sensor of each one of the plurality of power outputs, wherein the logic controller controls power to each one of the plurality of power outputs via the single switch.

2. The apparatus of claim 1, further comprising:
a single high reference signal;
a single low reference signal;
a single timing reference signal; and
a feedback sub-circuit.

3. The apparatus of claim 2, wherein the respective current/power sensor of each one of the plurality of power outputs receives the single hi reference signal, the single low reference signal and the single timing reference signal.

4. The apparatus of claim 1, wherein the logic controller toggles the single switch when a fault signal is received from the respective fault line of the respective current/power sensor of one of the plurality of power outputs.

5. The apparatus of claim 1, wherein the single switch comprises an electronic switch device.

6. The apparatus of claim 1, wherein the apparatus is a discrete circuit or an integrated circuit.

7. A method, comprising:
detecting that an amount of power at a current/power sensor of a plurality of different current/power sensors is greater than a threshold;
transmitting a fault signal generated by the current/power sensor to a logic controller; and
toggling a single switch in communication with the plurality of different current/power sensors via the logic controller in response to the fault signal.

8. The method of claim 7, further comprising:
periodically comparing the amount of power at the current/power sensor;

determining that the amount of power at the current power sensor is below the threshold; and toggling the single switch to provide power to the plurality of different current/power sensors.

9. The method of claim 7, further comprising:

ceasing transmission of the fault signal in response to the amount of power falling below the threshold; and toggling the single switch to provide power to the plurality of different current/power sensors.

10. The method of claim 7, wherein the threshold for each one of the plurality of different current/power sensors is different.

11. The method of claim 7, wherein the threshold for at least one of the plurality of different current/power sensors is a dynamic threshold.

12. A non-transitory computer readable storage medium storing instructions that, when executed by a processor, cause the processor to:

receive a fault signal from one of a plurality of current/power sensors when an amount of power exceeds a threshold; and toggle a single electronic switch device in response to the fault signal to remove power from each one of the plurality of current/power sensors.

13. The non-transitory computer readable storage medium of claim 12, wherein the instructions, when executed, cause the processor to:

detect when the fault signal is stopped in accordance with a respective fault recover policy of one of the plurality of current/power sensors, wherein the respective fault recover policy is one of a plurality of different fault recover policies of the plurality of current/power sensors; and toggle the single electronic switch device to resume providing power to each one of the plurality of current/power sensors.

14. The non-transitory computer readable storage medium of claim 12, wherein the threshold is determined by a value of a single high reference signal.

* * * * *